United States Patent Office 2,948,114
Patented Aug. 9, 1960

2,948,114

ENGINE FUEL CONTROL INCLUDING ACCELERATION-BIASED CONTROL SIGNAL SELECTOR

Jacques Pierre Joseph Beslier, Puteaux, Leon Cotadze, Carrieres-sur-Seine, and Pierre Chaffiotte, Cormeilles-en-Parisis, France, assignors to Societe d'Exploitation des Materiels Hispano-Suiza, Bois-Colombes, France, a French society Filed Aug. 8, 1956, Ser. No. 602,802

Claims priority, application France Mar. 17, 1956

4 Claims. (Cl. 60—35.6)

The present invention relates to jet engines through which a continuous gas stream is flowing, i.e. in particular turbo-jet engines as used for aircraft propulsion.

The object of our invention is to provide an engine of the above mentioned kind which is better adapted to meet the requirements of practice than those used up to this time and in particular which includes an automatic regulating system capable of protecting the engine against the effects of several operational factors of the engine exceeding preselected maximum values.

Our invention is concerned with an engine as above specified, provided with a regulation system arranged to control the feed of fuel to said engine in accordance with the algebraic differences between the rotational speed of the engine on the one hand, and at least one other operational factor on the other hand, and, respectively, the maximum values for said two above mentioned factors that have been predetermined and toward which said two operational factors (the rotational speed and the other factor) should tend without however exceeding them, a comparator device being provided to make at any time a selection between these two operational factors so that regulation is effected as a function of only one of these two factors, to wit the one which is more alarming than the other and must be able to given priority.

According to our invention, we further provide the engine with an accelerometric device capable of emitting a signal which is substantially proportional to the acceleration of the engine, this accelerometric device cooperating, on the one hand with the regulating servo-mechanism through which that of the two above mentioned regulation factors which has been given priority controls the feed of fuel to the engine, and this in such a manner that a positive acceleration of the engine tends to reduce the flow rate of fuel, and on the other hand, preferably, with said comparator device so that said comparator device is held, for positive accelerations of the engine, in the state for which the regulation factor that is given priority is the rotational speed of the engine.

A preferred embodiment of the present invention will be hereinafter described with reference to the accompanying drawings given merely by way of example and in which.

Figure 1:
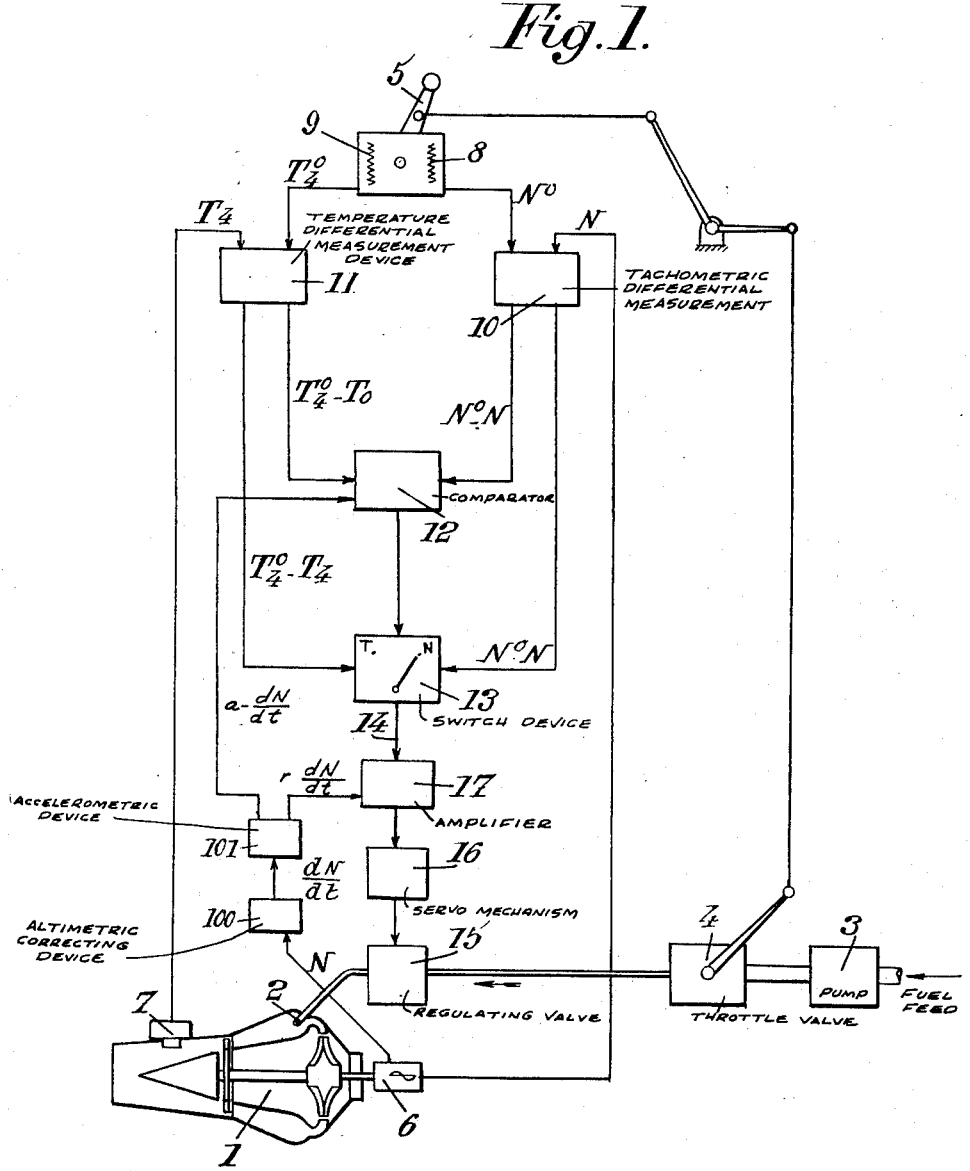
Fig. 1 shows the lay-out of a regulating system for a turbo-jet engine made according to the present invention.

In the following description, it will be supposed that the problem is to provide an aircraft turbo-jet engine 1 (of any suitable construction but the propelling nozzle of which is not of variable area) with a regulating system operating in response to variations of the rotational speed (number N of revolutions per minute of the turbine of the engine) and of the temperature $T_4$ of the engine nozzle.

By way of example, it has been supposed that the injectors 2 of the turbo-jet engine 1 are fed with fuel from a high pressure pump 3 the output of which is automatically varied as a function of the barometric pressure, that is to say which gives a fuel delivery pressure varying in the same way as the total pressure $P_1$ at the intake of the engine compressor, a throttle valve 4 controlled by a piloting element (such as a lever 5) being interposed between pump 3 and injectors 2.

It is known that, with such a piloting system, the fact of placing lever 5 in a given position corresponds to preselecting for the turbo-jet engine, in given ambient conditions (pressure $P_{t1}$ and temperature $T_1$ at the intake of the compressor), a rotational speed $N°$ to which must theoretically correspond a nozzle temperature $T°_4$.

This rotational speed $N°$ and this temperature $T°_4$ then constitute two preselected maximum values and the actual rotational speed $N$ and temperature $T_4$ must be as close as possible to these two values but must not exceed them, if it is desired to obtain the maximum performance without impairing safety.

In these conditions, the regulation system which is to be provided according to the present invention must, for a given position of the control lever 5, adjust the fuel flow rate in accordance with the values of differences $N°−N$ and $T°_4−T_4$ in such manner as to give the rotational speed $N$ and the corresponding nozzle temperature $T_4$ values as close as possible to the maximum values $N°$ and $T°_4$ predetermined by the position given to lever 5.

Now it is impossible, in the case that is considered of a turbo-jet engine the nozzle af which is not of the variable area type, simultaneously to obtain the maximum rotational speed $N°$ and the corresponding maximum nozzle temperature $T°_4$, except for well determined flying conditions.

For all other flying conditions, the predetermined maximum value will be reached by one of these two regulation factors when the other regulation factor is still at a value different from the maximum value which it should have in accordance with the position given to lever 5.

It will be understood that, in these conditions, the task of the regulation system will be very difficult, due to the fact that it must control the feed of fuel to injectors 2 in accordance with two regulation factors $N$ and $T_4$ which must not remain above the predetermined values $N°$ and $T°_4$ but which must both tend toward these values without however being able to reach them simultaneously (except for well determined flying conditions).

To make allowance for this, the regulation system is arranged in such manner that it is capable of comparing, at any time, the tachometric and thermometric differences and of choosing, between the two regulation factors or parameters, that which is more alarming than the other, the rate of feed of fuel to the engine being controlled as a function of the more alarming parameter with the exclusion of the other.

When both of the regulation factors $N$ and $T_4$ tend respectively toward the maximum values $N°$ and $T°_4$ without having reached them, the factor which is more alarming than the other is that which is closer to the corresponding maximum, that is to say the one which should normally reach its corresponding maximum value before the other.

When one of the regulation factors has reached or exceeded the corresponding maximum, whereas the other factor is still below its respective maximum value, it is of course the factor which has reached or exceeded its maximum value which is more alarming than the other.

Finally, when both of the regulation factors have accidentally exceeded the corresponding respective maximum values, the one which is more alarming than the other is that which has exceeded its maximum value by the greater amount.

In other words, it may be stated, in a general fashion, that the factor which is more alarming than the other, at a given time, is that the value of which at the time that is considered is more likely than the other to impose an undue stress upon the turbo-jet engine.

According to our invention, as diagrammatically illustrated by Fig. 1, the regulation system includes the following elements:

An apparatus for electrically measuring the variations of the rotational speed N of the turbo-jet engine, this apparatus being constituted, for instance, by a tachometric alternator 6 driven by the turbo-jet engine and supplying an alternating voltage the frequency of which varies in accordance with the value of the rotational speed N and can therefore serve electrically to measure the variations of said speed;

An apparatus for measuring the variations of temperature $T_4$ of the nozzle, this apparatus being for instance constituted by a thermometer 7, of the thermocouple and cold welded joint type, supplying a voltage which depends upon the value of temperature $T_4$;

Two indicator devices intended electrically to indicate a maximum rotational speed $N°$ and the corresponding maximum nozzle temperature $T°_4$, such devices being for instance constituted respectively by two potentiometers 8 and 9 controlled by lever 5;

A tachometric differential measurement device 10 which receives, respectively from alternator 6 and from potentiometer 8, the indications corresponding to the actual rotational speed N and to the rotational speed $N°$ indicated by potentiometer 8, said differential measurement device supplying an electric signal the direction and amplitude of which algebraically indicate the difference $N°-N$;

A temperature differential measurement device 11 which receives, respectively from thermometer 7 and from potentiometer 9, indications corresponding to the actual temperature $T_4$ and to the indicated temperature $T°_4$ marked by potentiometer 9, said differential measurement device supplying an electric signal the direction and amplitude of which algebraically indicate the difference $T°_4-T_4$;

A comparator device 12 which receives the algebraic differences $N°-N$ and $T°_4-T_4$ respectively detected by differential measurement devices 10 and 11, said comparator device being arranged in such manner as to indicate, by means of two different signals, which of the two factors N and T has a value, at the time that is considered, which is more alarming than the other and should therefore be given priority as regulation factor;

A switch device 13, capable of assuming two different positions and controlled by comparator 12, adapted to permit, according to which signal is received from said comparator, of connecting with an output conductor 14 that of the two differential measurement devices 10 and 11 which corresponds to the regulation factor that is to be given priority according to the operation of comparator 12;

And finally a regulating valve 15 controlled by a servo-mechanism 16, said servo-mechanism being fed with current from the output conductor 14 of switch 13, possibly through the intermediate of an amplifier 17.

It will be understood that, with such a regulation system, the degree of opening of the regulating valve 15 will be determined, at any time, in accordance with the algebraic value of the factor N or T which is to be given priority.

With a regulation system thus constituted, the rotational speed 6 of the turbo-jet engine can be stabilized to the maximum value $N°$ indicated in accordance with the position of lever 5 only after it has passed slightly above this maximum value.

This is due to the fact that, when the rotational speed of the turbo-jet engine reaches the indicated maximum value $N°$, the regulation is then taking place as a function of the tachometer and it is only when this maximum value has been exceeded that the regulation system acts upon the regulating valve 15 to close it until the rotational speed, after a gradual decrease, gets stabilized to the indicated maximum value $N°$.

Thus, every time the pilot wishes the engine to accelerate by setting a new indication of the maximum rotational speed, the rotational speed of the engine actually passes automatically beyond this new maximum value, which may be contrary to a good operation of the rotating parts of said engine in some cases.

The object of our invention is to prevent, in such cases, the rotational speed N of the turbo-jet engine from taking a value above the new maximum value indicated in accordance with the position of lever 5.

For this purpose, the regulation system includes an accelerometric device 100 capable of emitting a signal substantially proportional to the acceleration of the engine, and this accelerometric device 100 is made to co-operate with the regulation amplifier 17 in a way such that any acceleration of the engine reacts in a preventative manner upon the regulating valve 15 in the closing direction, said accelerometric device being advantageously arranged so as to detect the rates of possible variations of voltage of the tachometric alternator 6, which variations are concomitant and proportional with the rotation accelerations $$\frac{dN}{dt}$$

The accelerometric device 100 may serve exclusively to perform the above mentioned preventative regulating correction, but preferably said device is made to cooperate with the comparator device 12 so that, when there is an acceleration of the rotational speed of the turbo-jet engine, said comparator device is held in the state where the regulation is performed in accordance with the rotational speed of the engine.

We thus avoid, during pick-up periods, alternate switchings from tachometric regulation to thermometric regulation and vice versa, which would be prejudicial to a good operation.

According to our invention, during such periods, the regulation is a tachometric regulation with a preventative correction in accordance with the derivative of the rotational speed of the engine.

On the other hand, if the accelerometric device 100 has been adjusted to emit a signal $$\frac{dN}{dt}$$

which is correct on the ground level, it will be necessary to provide, between said accelerometric device and the regulation amplifier 17, an altimetric correction device 101 arranged so as to modify the signal in accordance with a parameter depending upon the flying conditions, for instance the total pressure at the intake of the compressor of the engine, this pressure depending, for a given aircraft, upon the height of flight and the speed of the engine.

Of course, this correction must tend to keep the signal at the value to which it has been adjusted on the ground level. Otherwise, the signal would become too weak when the altitude increases due to the fact that the engine picks-up speed more slowly when at high altitude than on the ground level, and this weaker signal would no longer be sufficient to prevent the rotational speed from exceeding the new maximum value indicated in accordance with the position of lever 5.

In other words, the altimetric correcting device 101 must, when the altitude increases, reinforce the signal $$\frac{dN}{dt}$$

emitted by the accelerometric device 100, the signal thus reinforced being designated on Fig. 1 by the reference $$r \cdot \frac{dN}{dt}$$

On the contrary, the signal responsive to the value of the acceleration that is used for keeping comparator 12 in operation has requirements opposed to those concerning the signal sent to the regulation amplifier 17.

This is due to the fact that, at high flying speed, comparator 12 requires but a relatively low intensity signal because the tachometric and thermometric actions against which this signal must act in order to keep comparator 12 in operation are weaker when the aircraft is at high altitude than on the ground level since the values of N and $T_4$ are then relatively close to the desired maximums.

Therefore, the altimetric correcting device 101 is preferably arranged in such manner that it emits, toward the regulation amplifier 17, the reinforced signal $$r \cdot \frac{dN}{dt}$$

above referred to and, toward the comparator 12, a signal $$a \cdot \frac{dN}{dt}$$

which is weakened in accordance with the altitude.

In some cases it may be preferable to keep the corrections of signals $$r \cdot \frac{dN}{dt} \text{ and } a \cdot \frac{dN}{dt}$$

independent by controlling, by means of a piezometric deformable box, two resistors instead of a single one, each of these resistors acting respectively upon signals $$r \cdot \frac{dN}{dt} \text{ and } a \cdot \frac{dN}{dt}$$

according to the requirements of the turbo-jet engine that is considered.

Some of the elements of the regulation system which has been described are quite conventional and it seems unnecessary further to describe them. This is the case, in particular, of pump 3, valves 4 and 15, thermocouple thermometric device 7 and tachometric alternator 8.

Figure 2:
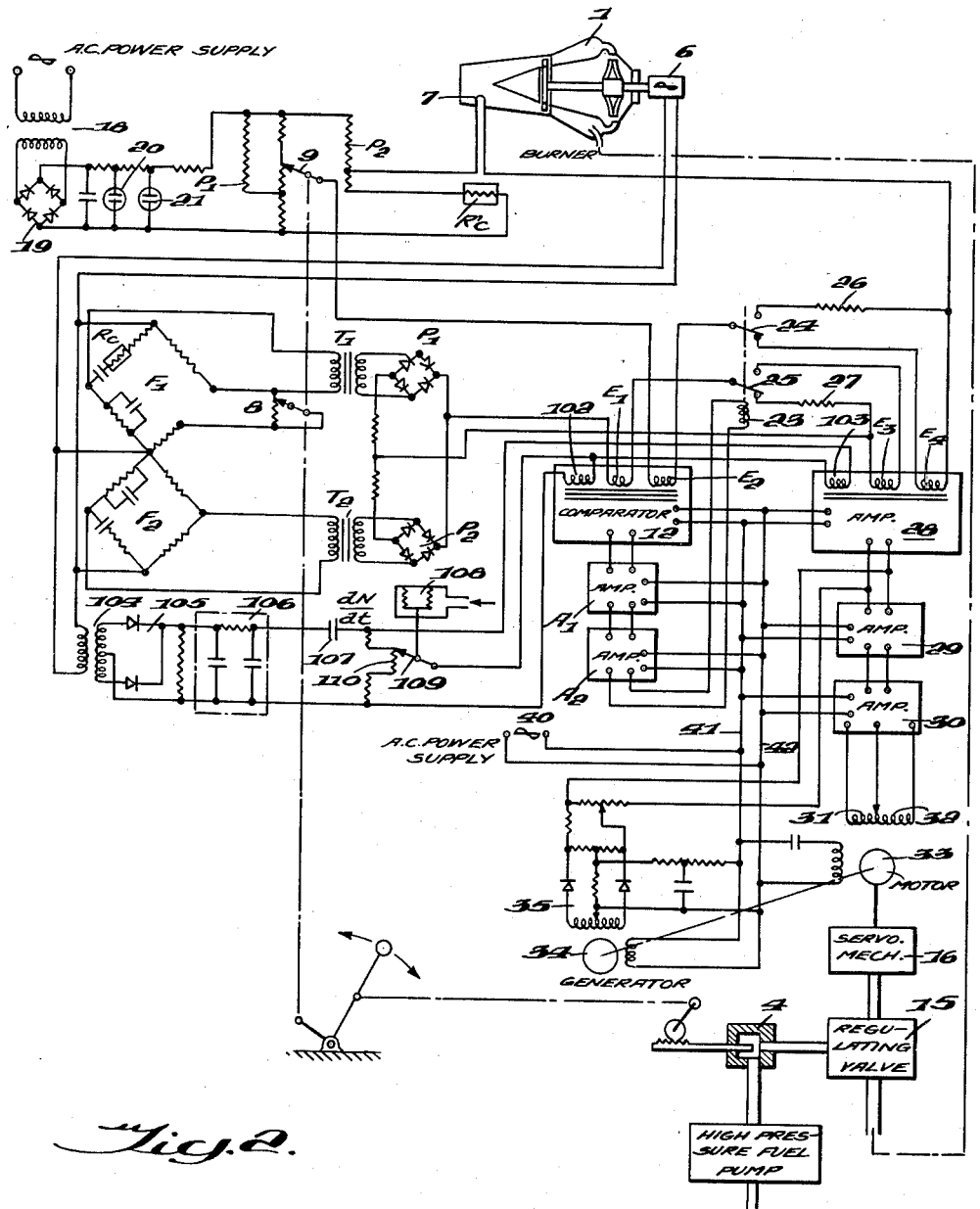
Fig. 2 shows in more detail the electrical lay-out of the tachometric responsive differential measurement device, temperature responsive measurement device, comparator device, switch device, regulation amplifier and accelerometric device with altimetric correction as used in the regulating system diagrammatically illustrated by Fig. 1.

We will now describe with reference to Fig. 2 a possible construction of the elements of the above described regulation system.

The differential measurement device includes two frequency bridges $F_1$ and $F_2$, of the "Wien bridge" type, which receive the voltage supplied by the tachometric alternator 6. The voltage collected in the measurement diagonal of the bridge depends upon the frequency and the voltage applied at the input. Theoretically, the output voltage is zero for the frequency of tuning of the bridge, whatever be the input voltage.

The two output voltages of the bridges are rectified and brought in opposition with each other so as to supply the output signal.

The two bridges have different tuning frequencies so that, within the range of utilization frequencies, the slopes of the two characteristics are in opposed directions.

The symmetrical mounting used for the two bridges permits of making the point of equilibrium non responsive to variations of the voltage of the alternator: only the frequency has an influence.

The variation of the point of equilibrium (as a function of the position of lever 5) is obtained by a variable resistor 8 inserted in one branch of one of the bridges so as to modify its characteristic and acting as potentiometer for indicting the maximum rotational speed N°.

The frequency bridges are constituted by means of resistors and capacitors. The temperature coefficient of these elements is compensated for by means of an element $R_c$, itself sensitive to variations of the temperature and inserted in one branch of one of the bridges so as to give the whole a total characteristic independent of the ambient temperature.

The voltages collected on the measurement diagonals are rectified after an impedance adaptation obtained by means of transformers $T_1$ and $T_2$. Rectification is obtained by means of dry rectifier bridges $P_1$ and $P_2$.

The indicated or desired rotational speed is obtained by means of the indicator resistor 8 the value of which is determined by a slider driven by the axis of lever 5. An adjustable resistor $8_a$, in series with the indicator resistor, permits of adjusting the maximum rotational speed indicated for full opening displacement of lever 5.

The two voltages rectified by the dry rectifiers $P_1$ and $P_2$ are set in opposition in two windings $E_1$ and $E_3$ mounted in series and each of which belongs to a magnetic amplifier or a magnetic modulator; the current which is produced then indicates, in sign and in absolute value, the difference between the actual rotational speed N and the maximum rotational speed N° indicated in accordance with the position of lever 5.

The differential temperature measurement device is arranged in such manner as to permit of placing in opposition, in two windings $E_2$ and $E_4$ mounted in series, the two electric voltages respectively supplied by the thermocouple thermometer 7 and by the potentiometer 9 indicating the desired maximum temperature, this last mentioned potentiometer being supplied with voltage from a voltage source which must be very stable.

This voltage source may be constituted, as shown on Fig. 2, by rectifying an alternating feed voltage after it has been increased in a transformer 18, the rectified and amplified voltage being then filtered through a filter 19, then prestabilized by a first stabilizing gas tube 20 before being applied to a high accuracy stabilizer tube 21 which permits of obtaining, across the terminals of the indicator potentiometer, a very accurate reference voltage.

This voltage is then fed to a voltage divider one of the components of which is the indicator potentiometer 9 itself.

In order to make it possible to compare the feed voltages of windings $E_2$ and $E_4$, the indicating voltages supplied by potentiometer 9 must be substantially of the same order of magnitude as those supplied by thermometer 7.

On the other hand and in order to adapt the law of factor indication to the different types of turbojet engines, it should be necessary to be able to vary the level of the indicated voltage and the slope of the indication curve as a function of the position of the slider, in order to adjust the temperature that is indicated to the value $T°_4$ when the lever 5 is in the full opening position. In order to permit such adjustments without modifying the stability of the reference voltage, the equivalent resistance of the indicator bridge seen from the feed source must be substantially constant. These adjustments are obtained by means of two potentiometers one of which, $P_2$, adjusts the level and the other, $P_1$, the slope of the indicator curve.

For compensation of the cold welds of thermometer 7, we insert in one of the branches of the indicator bridge a compensation resistor R'C. This resistor, being sensitive to temperature variations, permits of correcting the voltage that is indicated as a function of the temperature of the cold junctions of the thermocouples; the compensation resistor and the cold junctions are placed in an isotherm container in such manner as to avoid temperature gradients.

The comparator device includes a magnetic circuit on which are disposed, on the one hand the winding $E_1$ of the tachometric differential measurement device (through which passes an electric current which is a function of the difference $N°-N$) and, on the other hand, the winding $E_2$ of the temperature differential measurement device (through which flows an electric current which is a function of the difference $T°_4-T_4$). Windings $E_1$ and $E_2$ are disposed in such manner that the fluxes they produce are of opposed directions if the two signals corresponding to differences $N°-N$ and $T°_4-T_4$ are of the same direction, for instance when N is greater than N° while $T_4$ is greater than $T°_4$, whereby the resultant flux represents the algebraic difference between the two signals corresponding to differences $N°-N$ and $T°_4-T_4$. In other words, the direction of the resultant flux is the same as that of the component flux (flux in winding $E_1$ or flux in winding $E_2$) having the highest absolute value, and its absolute value is equal to the algebraic sum of the two component fluxes.

For practical purposes we may use, as magnetic circuit, that of the transducer of a magnetic amplifier or of a magnetic modulator. This arrangement ensures a correct comparison since it is made directly from the differences, without intermediate amplification.

In view of the fact that the currents representing the above mentioned differences that flow in the windings $E_1$ and $E_2$ are of very different values, the corresponding fluxes must be given values of the same order of magnitude so as to make it possible to compare them. For this purpose, the number of turns of the two windings are chosen in a ratio such that it permits of comparing the tachometric difference with the temperature difference.

At the output of the comparison magnetic stage, there is supplied a current the direction and intensity of which represent the algebraic difference between the two differences $N°-N$ and $T°_4-T_4$, this current being used as a signal for controlling the two position switch 13.

Finally this comparator device 12 is completed by a holding winding 102 intended to receive the accelerometric signal from altimetric corrector device 101, the direction of this winding and the direction in which it is fed with current being such that the signal resulting from an acceleration of the turbo-jet engine holds the switch device diagrammatically shown at 13 on Fig. 1 in the position corresponding to tachometric regulation.

This switch device includes an amplifier, a magnetic one for instance, the input winding of which is connected with the output of comparator 12.

In the example shown, this amplifier includes two magnetic stages connected in cascade $A_1$ and $A_2$. The output of the second magnetic stage $A_2$ is connected to a coil 23 capable of operating two single pole reversing switches 24 and 25.

The reversing switch 24 directs the thermometric difference signal, either toward the thermometric input winding $E_4$ of the regulating amplifier 17, or toward a resistor 26 equivalent to said winding $E_4$, this resistor 26 preventing a variation of characteristics of the temperature differential measurement device when regulation is based on the tachometric indications.

As for reversing switch 25, it directs the tachometric difference signal either toward the tachometric input winding $E_3$ of the regulation amplifier 17, or toward a resistor 27 equivalent to said winding $E_3$, this resistor 27 preventing a variation of the characteristics of the tachometric differential measurement device 10 when the regulation is based on the thermometric indications.

The regulation amplifier (diagrammatically indicated at 17 on Fig. 1) includes the two input windings $E_3$ and $E_4$ just above referred to.

This amplifier includes three stages 28, 29 and 30 mounted in cascade. The amplified signal is available at the output of the third stage in the form of two voltages which are applied, respectively, to the two control half-windings 31, 42 of a two-phase motor 33 belonging to the servo-mechanism (indicated at 16 on Fig. 1) through which the regulation valve 15 is controlled. The error signal modifies these two voltages in amplitude and in phase in such manner as to enable motor 33 to turn in one direction and with a speed which depend upon the direction and intensity of the signal which has been given priority to control regulation.

On the other hand, and in order to make sure that the number of revolutions per unit of time of motor 33 corresponds in a correct fashion to the intensity of the error signal, a negative feedback is exerted by means of a tachometric generator 34 driven by motor 33. The signal supplied by this generator is applied on a phase detector bridge 35 which delivers a continuous voltage the direction and magnitude of which depend upon the direction and speed of rotation of generator 34, therefore of motor 33. This voltage is then applied on the input of the second magnetic stage 29 in opposition with the difference signal (negative feedback).

On the other hand, as in the case of the differential measurement devices, the signals indicating the above mentioned differences are transformed, in order to have equivalent orders of magnitude for N and $T_4$, by giving windings $E_3$ and $E_4$ a number of turns such that the ampere-turns are comparable.

In order to place the regulation amplifier 17 under control of the accelerometric device 100, the input stage 28 is provided with a third winding 103 the winding direction and the connection of which are such that the reinforced accelerometric signal $$r \cdot \frac{dN}{dt}$$

tends to operate the servo-control mechanism 16 in the direction corresponding to closing of the regulating valve 7.

A source of alternating current 40 is connected with a line 41, 42 from which start the power feed connections leading to comparator 12, amplifier stages $A_1$ and $A_2$ and 28, 29, 30 and motor and generator windings 33 and 34 respectively.

The accelerometric device diagrammatically shown at 100 on Fig. 1 includes (Fig. 2) a voltage adapting transformer 104, if necessary, on which is applied the voltage delivered by the tachometric alternator 6, the output voltage of this transformer 104 being rectified in a dry rectifier bridge 105, then filtered in a filter 106, so as to be finally applied on a condenser 107 inserted in series in a circuit including, also in series, the winding 102 which serves to hold the comparator 12 in operation and the winding 103 which serves to place the regulation amplifier 17 under control of the accelerometric indications.

With such an arrangement we obtain, through condenser 107, for a variable rotational speed of the turbo-jet engine, a current which depends upon the rate of variation of the voltage of generator 6, that is to say a current which represents the acceleration of the engine and which, therefore, constitutes the accelerometric signal $$\frac{dN}{dt}$$

issuing from the accelerometric device 100.

As for the altimetric corrector device diagrammatically shown at 101 on Fig. 1, it includes (Fig. 2) a barometric deformable box or bellows 108 responsive to the total pressure at the intake of the compressor of the engine, said box controlling the slider 109 of a variable resistor 110 connecting the inputs of windings 102 and 103 and thus making it possible to obtain, for a given signal $$\frac{dN}{dt}$$

differentiated signals in each of said windings.

The adjustment is such that slider 109 occupies, on the ground level, an end position I for which the holding winding 102 receives a maximum signal $$a \cdot \frac{dN}{dt}$$

and the accelerometric regulation winding 103 receives a minimum signal $$r \cdot \frac{dN}{dt}$$

said slider 109 occupying, on the contrary, at the maximum altitude that may be reached, another end position II for which the holding winding 102 receives a minimum signal $$r \cdot \frac{dN}{dt}$$

and the regulation winding 103 a maximum signal $$a \cdot \frac{dN}{dt}$$

The desired differential distribution is thus truly obtained, as a function of the altitude, for accelerometric signals transmitted respectively to comparator 12 and regulation amplifier 17.

For a given type of engine the requirements of which would be different, the regulation of the signals $$r \cdot \frac{dN}{dt} \text{ and } a \cdot \frac{dN}{dt}$$

might be obtained by means of two separate variable resistors, both controlled by deformable box or bellows 108.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. For use with a turbo-jet engine including a gas turbine, means for feeding fuel to said turbine, valve means for controlling the flow rate of fuel from said feeding means to said turbine, a discharge nozzle downstream of said turbine, movable control means for adjusting said fuel feeding means, and two means operatively connected with said control means for indicating the respective theoretical values of two operational factors of said engine corresponding to the position of said control means, one of said factors being the speed of said turbine, a regulating system for said engine which comprises, in combination, two devices each for measuring the actual value of one of said factors, two differential measurement devices, each having its input connected on the one hand with said actual value measuring device for one of said factors respectively and on the other hand with said theoretical value indicating means for the same factor, each of said differential measurement devices being capable of measuring the algebraic difference between said theoretical value and said actual value, said two differential measurement devices being calibrated so that the values they measure are comparable, a comparator device having its input connected with the outputs of said two differential measurement devices, said comparator supplying at its output two different signals according as one or the other of said algebraic differences is smaller than the other, a regulating servo-mechanism for controlling said valve means operative in response to variations of the value measured by either of said differential measurement devices, switch means responsive to said signals for connecting with said servo-mechanism, at any time, that of said two differential measurement devices, switch means responsive to said signals for connecting with said servo-mechanism, at any time, that of said two differential measurement devices which is measuring an algebraic difference smaller than that measured by the other differential measurement device, and accelerometric means responsive to variations of the rotational speed of said turbine and operatively connected with said comparator device for causing said comparator device to keep transmitting the signal concerned with the turbine speed to the servo-mechanism as long as said speed is increasing.

2. For use with a turbo-jet engine including a gas turbine, means for feeding fuel to said turbine, valve means for controlling the flow rate of fuel from said feeding means to said turbine, a discharge nozzle downstream of said turbine, movable control means for adjusting said fuel feeding means, and two potentiometric means operatively connected with said control means for adjustment to the respective theoretical values of two operational factors of said engine corresponding to the position of said control means, one of said factors being the rotational speed of said turbine, a regulating system for said engine which comprises, in combination, a tachometric measurement device and another measurement device capable of supplying respective voltages proportional to the actual values of said rotational speed and of the other of said factors respectively, two differential measurement devices, one of them being a tachometric differential measurement device, each of said differential devices having its input connected on the one hand with said actual value measuring device for one of said factors respectively and on the other hand with said theoretical value indicating means for the same factor, each of said differential measurement devices being capable of measuring the algebraic difference between said theoretical value and said actual value, said two differential measurement devices being calibrated so that the values they measure are comparable, a comparator device having its input connected with the outputs of said two differential measurement devices, said comparator supplying at its output two different signals according as one or the other of said algebraic differences is smaller than the other, a regulating servo-mechanism for controlling said valve means operative in response to variations of the value measured by either of said differential measurement devices, switch means responsive to said signals for connecting with said servo-mechanism, at any time, that of said two differential measurement devices which is measuring an algebraic difference smaller than that measured by the other differential measurement device, and accelerometric means responsive to variations of the rotational speed of said turbine and operatively connected with said comparator device for causing said comparator device to keep transmitting the signal concerned with the turbine speed to the servo-mechanism as long as said speed is increasing.

3. For use with a turbo-jet engine including a gas turbine, means for feeding fuel to said turbine, valve means for controlling the flow rate of fuel from said feeding means to said turbine, a discharge nozzle downstream of said turbine, movable control means for adjusting said fuel feeding means, and two potentiometric means operatively connected with said control means for adjustment to the respective theoretical values of two operational factors of said engine corresponding to the position of said control means, one of said factors being the rotational speed of said turbine, a regulating system for said engine which comprises, in combination, a tachometric measurement device and another measurement device capable of supplying respective voltages proportional to the actual values of said rotational speed and of the other of said factors respectively, two differential measurement devices, one of them being a tachometric differential measurement device, each of said differential devices having its input connected on the one hand with said actual value measuring device for one of said factors respectively and on the other hand with said theoretical value indicating means for the same factor, each of said differential measurement devices being capable of measuring the algebraic difference between said theoretical value and said actual value, said two differential measurement devices being calibrated so that the values they measure are comparable, a comparator device having its input connected with the outputs of said two differential measurement devices, said comparator supplying at its output two different signals according as one or the other of said algebraic differences is smaller than the other, a regulating servo-mechanism for controlling said valve means operative in response to variations of the value measured by either of said differential measurement devices, switch means responsive to said signals for connecting with said servo-mechanism, at any time, that of said two differential measurement devices which is measuring an algebraic difference smaller than that measured by the other differential measurement device, accelerometric means responsive to variations of the rotational speed of said turbine and operatively connected with said servo-mechanism for causing it to act on said valve means to reduce the flow rate of fuel to said engine when the rotational speed of said turbine is increasing, and means operative by said accelerometric means and operatively connected with said comparator device for causing said comparator device to keep transmitting the signal concerned with the turbine speed to the servo-mechanism as long as said speed is increasing.

4. A system according to claim 3 further including means responsive to the variations of the atmospheric pressure for maintaining a correct action of said accelerometric means despite variations of said pressure.

References Cited in the file of this patent

UNITED STATES PATENTS

| | | |
|---|---|---|
| 2,623,354 | Best | Dec. 30, 1952 |
| 2,697,908 | Offner | Dec. 28, 1954 |
| 2,734,340 | Wood | Feb. 14, 1956 |
| 2,760,337 | Ciscel et al. | Aug. 28, 1956 |
| 2,772,378 | Farkas | Nov. 27, 1956 |
| 2,764,867 | Farkas | Oct. 2, 1956 |

OTHER REFERENCES

"Electrical Measurements," by Terman and Pettit, published 1952 by McGraw-Hill, Second Edition, pages 69–73.